United States Patent
Tsuchiya et al.

(10) Patent No.: US 10,310,869 B2
(45) Date of Patent: Jun. 4, 2019

(54) PROCESS CONTROL APPARATUS AND SYSTEM AND UPDATING METHOD THEREFOR

(71) Applicant: Yokogawa Electric Corporation, Musashino-shi, Tokyo (JP)

(72) Inventors: Masanobu Tsuchiya, Tokyo (JP); Takeshi Ohno, Tokyo (JP)

(73) Assignee: YOKOGAWA ELECTRIC CORPORATION, Musashino-shi (JP)

( * ) Notice: Subject to any disclaimer, the term of this patent is extended or adjusted under 35 U.S.C. 154(b) by 821 days.

(21) Appl. No.: 14/309,436

(22) Filed: Jun. 19, 2014

(65) Prior Publication Data

US 2014/0379134 A1    Dec. 25, 2014

(30) Foreign Application Priority Data

Jun. 24, 2013  (JP) ................. 2013-131714

(51) Int. Cl.
*G06F 9/445* (2018.01)
*G05B 19/042* (2006.01)
*G06F 9/455* (2018.01)

(52) U.S. Cl.
CPC ....... *G06F 9/4451* (2013.01); *G05B 19/0426* (2013.01); *G06F 9/45558* (2013.01); *G05B 2219/23327* (2013.01)

(58) Field of Classification Search
CPC ............. G06F 9/4451; G06F 9/45558; G05B 19/0426; G05B 2219/23327
(Continued)

(56) References Cited

U.S. PATENT DOCUMENTS 8,881,139 B1 * 11/2014 Acacio ............... G06F 8/76
                                                717/140
2007/0078980 A1  4/2007 Tomita et al.
(Continued)

FOREIGN PATENT DOCUMENTS

EP    2 642 360 A1    9/2013
EP    2 682 829 A2    1/2014
(Continued)

OTHER PUBLICATIONS

"Virtualization Reduces the Cost of Supporting Open Industrial Control Systems", Honeywell Process Solutions, Jul. 1, 2009, Cited in European Search Report dated Apr. 9, 2015, issued in Patent Application No. 14173272.7 (11 pages).

*Primary Examiner* — S. Sough
*Assistant Examiner* — Kimberly L Jordan
(74) *Attorney, Agent, or Firm* — Westerman, Hattori, Daniels & Adrian, LLP (57) ABSTRACT

A process control apparatus includes a virtualization unit configured to operate in hardware, first and second operating systems configured to run in the virtualization unit, an application configured to run in the first operating system, and configured to control an industrial process by communicating with field devices, a recording unit configured to record a first information required for restoration of the application and a second information passed between the first operating system and the application, and a restoration unit configured to use a history of the second information to set the second operating system to the same state as the internal state of the first operating system, and configured to use the first information to restore the application running in the first operating system into the second operating system.

20 Claims, 7 Drawing Sheets

(58) Field of Classification Search
USPC .............................................................. 718/1
See application file for complete search history.

(56) References Cited

U.S. PATENT DOCUMENTS

| | | | | |
|---|---|---|---|---|
| 2009/0132057 A1* | 5/2009 | Kettu | ....................... | B25J 9/161 |
| | | | | 700/5 |
| 2011/0246922 A1* | 10/2011 | Koenig | .................... | G06F 9/461 |
| | | | | 715/771 |
| 2012/0017213 A1* | 1/2012 | Hunt | ........................ | G06F 21/53 |
| | | | | 718/100 |
| 2013/0047160 A1* | 2/2013 | Conover | .................... | G06F 8/65 |
| | | | | 718/1 |
| 2013/0253671 A1* | 9/2013 | Torigoe | .............. | G05B 19/0421 |
| | | | | 700/82 |
| 2014/0012398 A1* | 1/2014 | Kanbe | .................... | G05B 15/02 |
| | | | | 700/2 |
| 2015/0234713 A1* | 8/2015 | Shimada | ............. | G06F 11/1451 |
| | | | | 714/19 |

FOREIGN PATENT DOCUMENTS

| | | | |
|---|---|---|---|
| JP | 11-003240 A | 1/1999 |
| JP | 4399773 B2 | 1/2010 |
| WO | 2005/050336 A1 | 6/2005 |

\* cited by examiner

PROCESS CONTROL APPARATUS AND SYSTEM AND UPDATING METHOD THEREFOR

BACKGROUND OF THE INVENTION

Field of the Invention

The present invention relates to a process control apparatus and system and to an updating method therefor.

Priority is claimed on Japanese Patent Application No. 2013-131714, filed Jun. 24, 2013, the content of which is incorporated herein by reference.

Description of Related Art

Conventionally, in a plant, a factory, and so on (hereinafter, collectively referred to as a plant), a processing control system is implemented that controls various state quantities (for example, pressure, temperature, and flow amount, or the like) in an industrial process, thereby achieving highly automated operation.

Specifically, for example, as indicated in Patent Reference 1 (Japanese Patent Publication No. 4399773), Patent Reference 2 (International Patent Publication 2005/050336), and Patent Reference 3 (US Patent Application Publication 2007/0078980) below, a controller forming the core of the process control system acquires detection results from a plurality of sensors (flowmeters and temperature gauges or the like). Depending upon these detection results, the controller determines the actuation amounts of actuators (such as valves). The controller operates the actuators depending upon the actuation amounts, so that the above-described state quantities are controlled.

Although conventional plant control systems have been implemented using dedicated devices having unique specifications, in recent years plant control systems are in the process of becoming open, and many of them have come to be implemented using general-purpose devices (such as computers and workstations) with general-purpose open specifications. In a plant control system using such general purpose devices, similar to the case of general information systems, it becomes necessary to replace hardware and improve software. Software improvements include such things as functional enhancement of an operating system and correction of problems or vulnerability in the operating system.

Patent Reference 4 (Japanese Laid-open Patent Publication No. JPA 11 (1999)-3240) noted below discloses art, in a computer control system in which duplexed processors units (control side and standby side) are installed, enabling a change in the system program without influencing the object of control. Specifically, the standby side is temporarily stopped and loaded with a new system program, after which the standby side is started, the application data that had been stored in the control side is copied into the standby side, and then the control side is stopped and the standby side is then started as the control side, so that the system program is changed without influencing the object of control.

Because almost all process control systems are required to operate continuously over long periods of months or years, it is not possible to arbitrarily stop a process control system that is in operation. For example, with the exception of shutdowns for periodic maintenance or to establish plant safety, stopping a process control system is basically not allowed.

Because from a safety standpoint a process control system is required not to exhibit faulty operation or loss of operation, if the cause of faulty operation or the like (for example, a problem or weakness in the operating system) is discovered, it is necessary to take immediate action (updating of the operating system) that can eliminate that cause. However, as described above, because a process control system cannot be arbitrarily stopped, even if a potential cause of faulty operation is discovered, this may lead to a problem in which it is not possible to take appropriate action immediately.

It can be envisioned that, using the art disclosed in Patent Reference 4 noted above, it is possible to update the operating system without stopping the process control system and influencing the object of control. However, the art disclosed in Patent Reference 4 noted above executes a new system program at the control side, without sufficiently verifying operation under actual operating conditions. This may lead to a problem that, even if it is possible to update the operating system without stopping the process control system, it is not possible to guarantee stable continued operation of an application on a newer operating system of which version is upgraded.

SUMMARY OF THE INVENTION

A process control apparatus that controls an industrial process implemented in a plant, the process control apparatus may include a virtualization unit configured to operate in hardware, first and second operating systems configured to run in the virtualization unit, an application configured to run in the first operating system, and configured to control the industrial process by communicating with field devices performing at least one of measurement and actuation required for control of the industrial process, a recording unit configured to record a first information required for restoration of the application and a second information passed between the first operating system and the application, and a restoration unit configured to use a history of the second information recorded in the recording unit to set the second operating system to the same state as the internal state of the first operating system, and configured to use the first information to restore the application running in the first operating system into the second operating system.

DETAILED DESCRIPTION OF THE INVENTION

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

A process control apparatus and system and an updating method therefor according to embodiments of the present invention are described below in detail, with references being made to the drawings.

First Embodiment (Configuration of the Process Control System)

Figure 1:
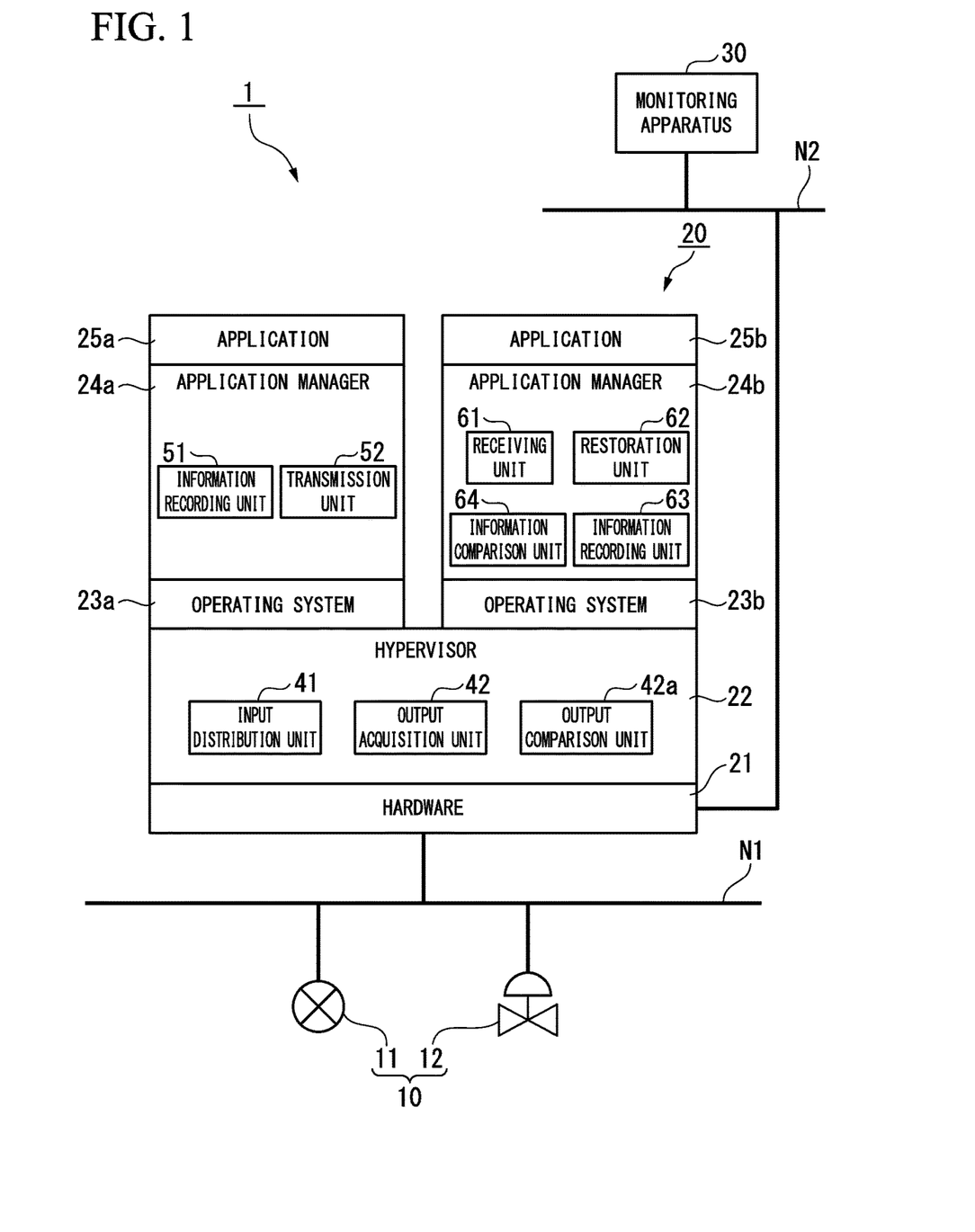
FIG. 1 is a block diagram showing the main parts of the configuration of a process control system according to a first embodiment of the present invention.

FIG. 1 is a block diagram of the main parts of the configuration of a process control system according to the first embodiment of the present invention. As shown in FIG. 1, a process control system 1 of the present invention has a plurality of field devices 10, a controller 20 (process control apparatus), and a monitoring apparatus 30, and the controller 20 controls field device 10 under monitoring by the monitoring apparatus 30, thereby controlling an industrial process implemented in a plant (not shown). In the process control system 1 of the present embodiment, it is possible to update (also called "online version upgrade", and "online rev-up") the operating system used in the controller 20 under control by the monitoring apparatus 30. The word "update" includes meanings of downloading a new operating system, installing, booting, verifying by comparing a new operating system with an old operating system, switching to the new operating system.

In this case, the field devices 10 and the controller 20 are connected to the field network N1 and the controller 20 and the monitoring apparatus 30 are connected to the control network N2. The field network N1 is, for example, a cable network laid throughout an on-site location in a plant. The control network N2 is, for example, a cable network making connections between the plant on-site location and a monitoring room. The field network N1 and the control network N2 may alternatively be wireless networks.

The field devices 10 are, for example, sensor devices such as flowmeters and temperature sensors, valve devices such as a flow control valve or open-close valve, actuator devices such as fans and motors, and other devices installed in a plant. As an aid to understanding the description, FIG. 1 shows, of the field devices 10 installed in the plant, a sensor device 11 that measures the flow amount of a fluid and a valve device 12 that controls (actuates) a flow amount of a fluid.

The field devices 10 operate in accordance with control data that is transmitted from the controller 20 via the field network N1. For example, if a request to transmit measurement data (data indicating the result of measuring the flow amount of a fluid) is transmitted to the sensor device 11 from the controller 20, the sensor device 11 transmits measurement data to the controller 20 via the field network N1. If control data (data controlling an opening) is transmitted to the valve device 12 from the controller 20, the valve device 12 makes the opening of the valve passing the fluid the opening instructed by the control data.

Under the monitoring by the monitoring apparatus 30, the controller 20 collects measurement data from the field devices 10 (for example, the sensor device 11) and also controls the field devices 10 (for example, the valve device 12) based on the collected measurement data. The controller 20 also, based on instructions from the monitoring apparatus 30, updates the operating system that it itself uses. This function of the controller 20 is implemented by software being read into a computer, with software and hardware resources operating in concert.

Specifically, the function of the controller 20 is implemented by hardware 21, which is composed of an MPU (micro processing unit, microprocessor) and memory or the like, executing an installed program. In this case, a program for implementing a hypervisor 22 (virtualization unit), a program for implementing operating systems 23a and 23b (first and second operating systems), a program for implementing application managers 24a and 24b (first middleware and second middleware), and a program for implementing an application 25 are installed into the controller 20.

The example of updating the operating system 23a used in the controller 20 to the operating system 23b in the present embodiment will be described.

In order to do this, a program for implementing the operating system 23b and a program for implementing the application manager 24b are downloaded from the monitoring apparatus 30 and installed when updating the operating system 23a. Although details will be described later, the application 25b is the application 25a in the operating system 23a (application manager 24a) restored into the operating system 23b (application manager 24b).

The hypervisor 22 runs virtually in hardware 21 in place of hardware, and is provided for the purpose of causing independent operation of the operating system 23a, application manager 24a, and application 25a, and the respective operating system 23b, application manager 24b, and application 25b. Providing the hypervisor 22 enables the replacement of hardware 21 without switching the operating systems 23a and 23b, the application managers 24a and 24b, and the applications 25a and 25b.

In this case, providing the hypervisor 22 enables the operating systems 23a and 23b, the application managers 24a and 24b, and the applications 25a and 25b to be operated in the following manner.

(a) Running of only the operating system 23a, the application manager 24a, and the application 25a (b) Running of only the operating system 23b, the application manager 24b, and the application 25b (c) Parallel running of the operating system 23a, application manager 24a, and application 25a with the operating system 23b, application manager 24b, and application 25b As shown in FIG. 1, the hypervisor 22 has an input distribution unit 41 (distribution unit), an output acquisition unit 42 (acquisition unit), and an output comparison unit 42a. The input distribution unit 41 distributes measurement data and statuses from the field devices 10 (for example, the sensor device 11) to each of the operating systems 23a and 23b. The measurement data and the like distributed to the operating systems 23a and 23b are output to the applications 25a and 25b, via the application managers 24a and 25b, respectively.

The output acquisition unit 42 acquires the outputs of the operating systems 23a and 23b and outputs the output of the operating system 23a to the field devices 10 (for example, the valve device 12). The outputs of the operating systems 23a and 23b are control data output from the applications 25a and 25b via the application managers 24a and 24b and operating systems 23a and 23b respectively. The output acquisition unit 42 passes the acquired outputs of the operating systems 23a and 23b to the output comparison unit 42a.

Output comparison unit 42a compares the outputs from the output acquisition unit 42 (the outputs of the operating systems 23a and 23b). The output comparison unit 42a verifies whether or not the compared contents of the outputs of the operating systems 23a and 23b are the same and also verifies whether or not the timing gap in the compared outputs of the operating systems 23a and 23b is within a pre-established allowed range.

Although it will be described later in detail, the reason for providing the input distribution unit 41, the output acquisition unit 42, and the output comparison unit 42a in the hypervisor 22 is to align the operating timing of the operating system 23a and the application 25a with that of the operating system 23b and the application 25b, which operate in parallel thereto, to verify the operation of the parallel-operating operating system 23a and application 25a and the operating system 23b and application 25b, so that the processing of application 25a after the operational verification is carried on of the application 25b seamlessly. That is, this is done to verify whether or not the new operating system 23b and application 25b running in the operating system 23b operate in the same manner as the original operating system 23a and application 25a, so that it is possible for the new operating system 23b and application 25b processing to pick up from the original operating system 23a and application 25a, with the application operation remaining as is.

The operating systems 23a and 23b run independently in the hypervisor 22 and, for example, each performs the process management and memory management required to have the applications 25a and 25b run. As described above, in the present embodiment, the operating system 23a is the original operating system, and the operating system 23b is the new operating system.

The application managers 24a and 24b perform processing required for the application 25a in the operating system 23a (application manager 24a) to be restored into the operating system 23b (application manager 24b) as the application 25b. The application managers 24a and 24b perform processing required to verify whether or not the new operating system 23b and application 25b are operating in the same manner as the original operating system 23a and application 25a.

The application manager 24a is middleware installed between the operating system 23a and the application 25a. This application manager 24a has an information recording unit 51 (recording unit) and a transmission unit 52, and performs collection, recording, and transmission of information required for restoration of the application 25a into the operating system 23b (application manager 24b) as the application 25b and information used in verifying the operation of the new operating system 23b and the application 25b.

The information recording unit 51 records information (first information) required for restoration of the application 25a and information (second information) that is passed between the operating system 23a and the application 25a. Specifically, the information recording unit 51 records the following information.

(1) First Information

The first information includes loaded programs and all data that are resident in a memory space of a process of the application 25a. For example, the data includes contents of heap area and shared memory space used by the application 25a.

(2) Second Information

The second information includes contents sent from the application 25a to the operating system 23a, and contents sent from the operating system 23a to the application 25a. For example, the second information includes contents of system calls and signals.

The transmission unit 52 reads information recorded in the information recording unit 51 and transmits it to the application manager 24b. Because the application manager 24b is not loaded except for a time when the operation system is updated, transmission unit 52 does not send the information recorded in the information recording unit 51 to the application manager 24b.

The application manager 24b is middleware installed between the operating system 23b and the application 25b. The application manager 24b has a receiving unit 61, a restoration unit 62, an information recording unit 63, and an information comparison unit 64 (comparison unit), and performs processing that restores the application 25b into the operating system 23b (application manager 24b) and processing that verifies the operation of the new operating system 23b and application 25b.

The receiving unit 61 receives information transmitted from the transmitting unit 52 of the application manager 24a and outputs the information to the restoration unit 62 or the information comparison unit 64. The restoration unit 62 uses the information output from the receiving unit 61 to restore the application 25a in the operating system 23a (application manager 24a) into the operating system 23b (application manager 24b) as the application 25b.

In this case, the transmission of information from the transmission unit 52 to the receiving unit 61 is performed using a function of the operating system (for example a socket interface) via the operating systems 23a and 23b in sequence. Alternatively, this is performed using functions of the hypervisor 22 (for example, communication between a hypervisor call and a virtual machine) via the operating system 23a, the hypervisor 22 and the operating system 23b in that sequence.

The information recording unit 63 records information passed between the operating system 23b and the application 25b. The information comparison unit 64 compares information output from the receiving unit 61 (information passed between the operating system 23a and the application 25a) and information recorded in the information recording unit 63 (information passed between the operating system 23b and the application 25b). The information comparison unit 64 verifies whether or not the contents of the compared information are the same and verifies whether or not the timing gap of the compared information is within a pre-established allowable range.

The applications 25a and 25b run in the operating systems 23a and 23b (application managers 24a and 24b) and each controls the field devices 10 required to perform process control (for example, collection of measured data and the like from the sensor device 11 and transmission of control data to the valve sensor 12, and the like). As described above, although the application 25b is the application 25a restored into the operating system 23b (application manager 24b), the applications 25a and 25b run mutually independently.

The monitoring apparatus 30 is implemented by, for example, a computer, and is operated by an operator to monitor a process. Specifically, the monitoring apparatus 30 monitors and manages the operating systems 23a and 23b and the applications 25a and 25b running in the controller 20. Also, the monitoring apparatus 30 instructs the controller 20 performing the process control in accordance with an instruction from an operator. The monitoring apparatus 30, based on an instruction from an operator, also instructs the controller 20 to update the operating system 23a.

(Operation of the Process Control System)

Next, the operation of the process control system 1 constituted as described above will be described. The following is first a description of the operation of the controller 20 before switching from the operating system 23a to the operating system 23b (pre-switching operation), followed by a description of operation when switching from the operating system 23a to the operating system 23b (switching operation).

<Pre-Switching Operation>

Figure 2:
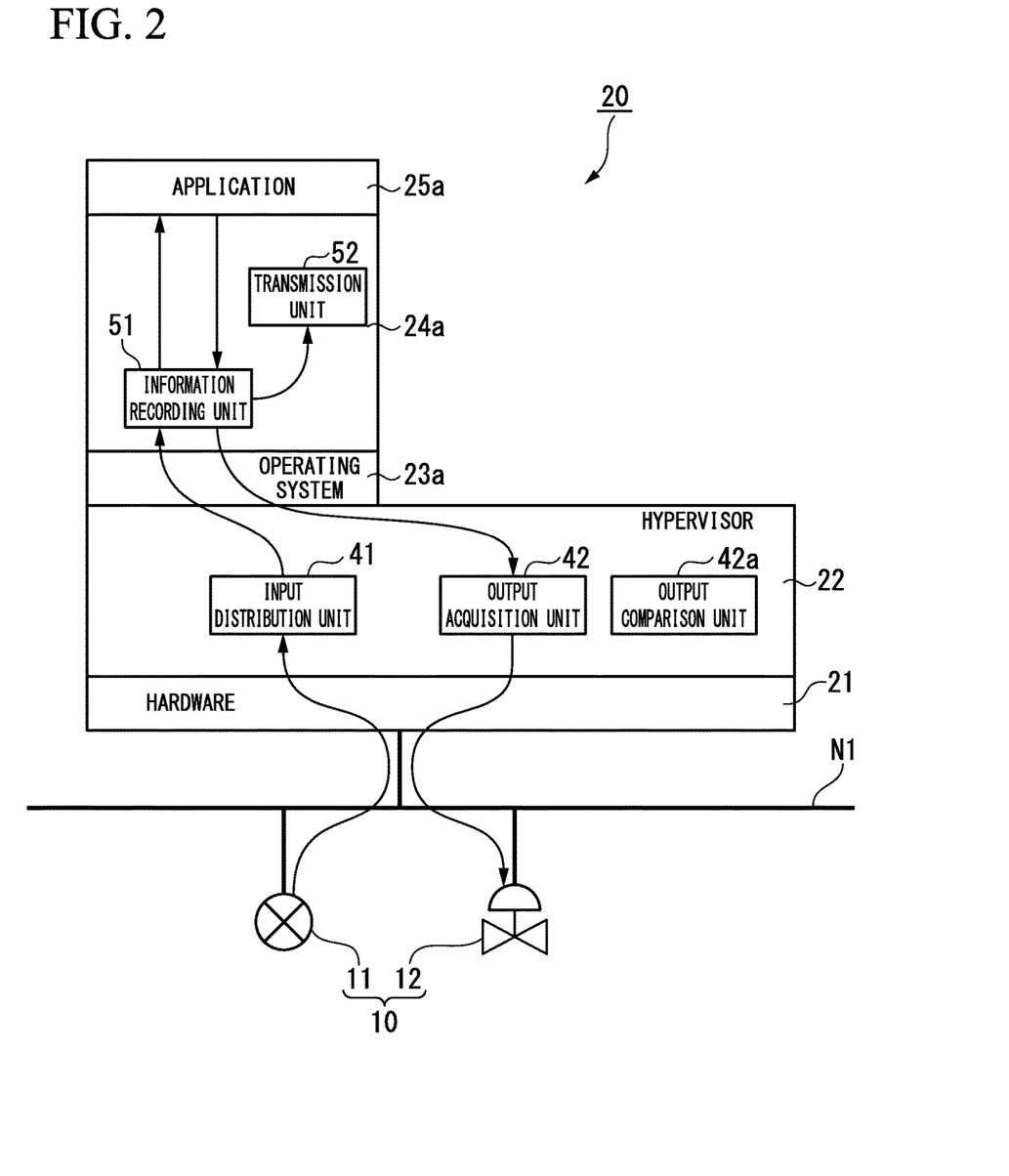
FIG. 2 is a drawing for describing the controller operation before switching in the first embodiment of the present invention.

FIG. 2 is a drawing for describing the pre-switching operation of the controller in the first embodiment of the present invention. As shown in FIG. 2, before the operating system 23a is updated, the operating system 23a runs in the hypervisor 22 in the controller 20, with the application manager 24a operating in the operating system 23a, and the application 25a running in the application manager 24a.

In this state, when measurement data from the sensor device 11 is input to the controller 20, the measurement data is input to the application 25a via the input distribution unit 41 provided in the hypervisor 22, the operating system 23a, and the application manager 24a, in that sequence. When this occurs, information passed between the operating system 23a and the application 25a is recorded in the information recording unit 51 and output to the transmitting unit 52.

When measurement data from the sensor device 11 is input to the application 25a, the control amount of the valve device 12 is determined depending upon the input measurement data, and control data indicating that control amount is output from the application 25a. This control data is output to the valve device 12 via the application manager 24a, the operating system 23a, and the output acquisition unit 42 of the hypervisor 22, in that sequence. When this occurs, the information passed between the operating system 23a and the application 25a is recorded in the information recording unit 51 and output to the transmission unit 52.

During the above operations, information required for the restoration of the application 25a, as described above, and information passed between the operating system 23a and the application 25a are recorded in the information recording unit 51 (first step). Measurement data and control data output to the transmission unit 52 from the information recording unit 51 is discarded during the application manager 24b is not loaded.

During the above operations, a program for implementing the operating system 23b and a program for implementing the application manager 24b are downloaded to the controller 20 from the monitoring apparatus 30 and installed. The installing of these programs is done at an arbitrary timing before the start of the updating of the operating system 23a, so that the process control of the controller 20 described above are not hindered. Also, if a program has been already downloaded, the existing program is overwritten with a later-downloaded program to be installed.

<Switching Operation>

Figure 3:
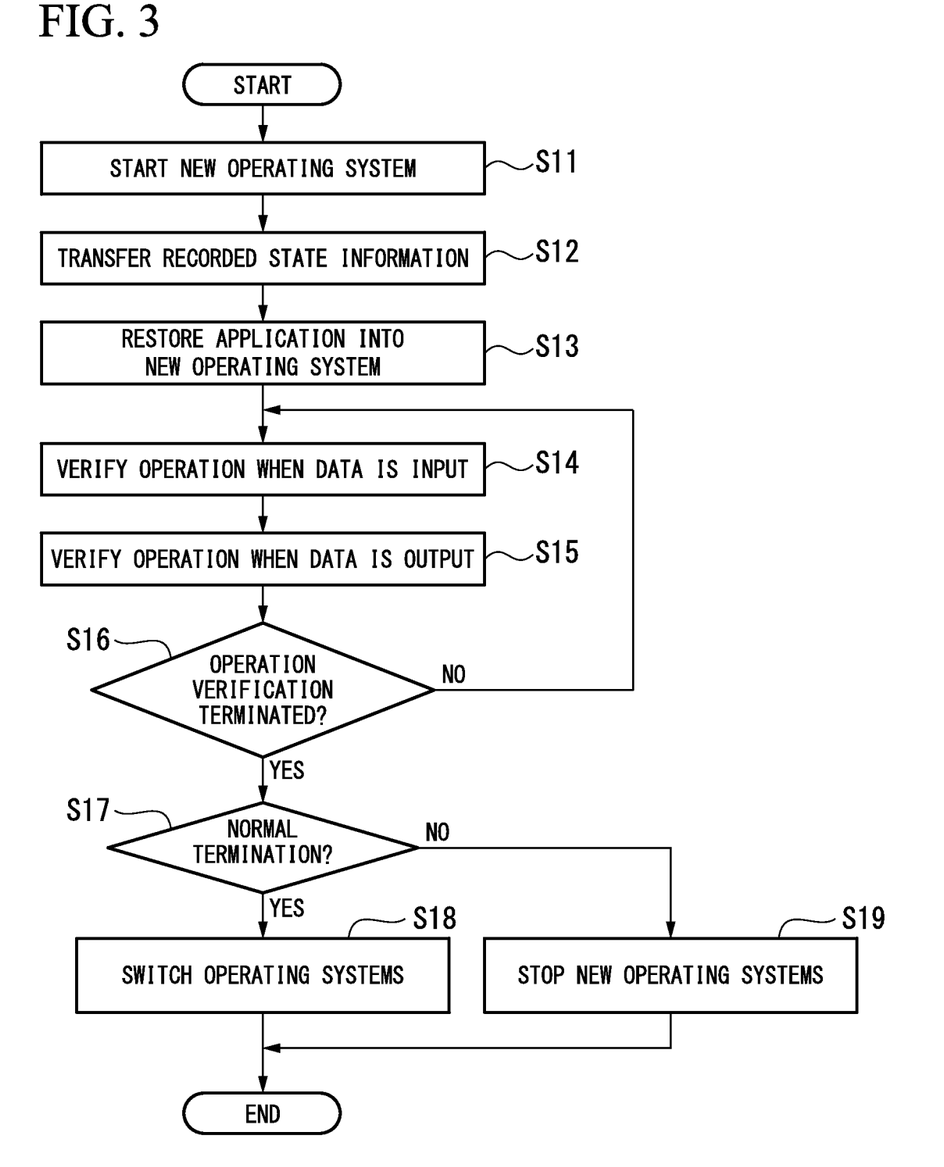
FIG. 3 is a flowchart showing the controller switching operation in the first embodiment of the present invention.

FIG. 3 is a flowchart of the controller switching operation in the first embodiment of the present invention. The processing in the flowchart of FIG. 3 starts at the timing of the output from the monitoring apparatus 30 of an operating system updating instruction to the controller 20. When processing starts, based on an instruction from the monitoring apparatus 30, the controller 20 performs processing to start the new operating system 23b (step S11).

Specifically, processing for executing the programs downloaded during the "pre-switching processing" described above (the program for implementing the operating system 23b and the program for implementing the application manager 24b) is performed. By this processing, the operating system 23b runs in the hypervisor 22, and the application manager 24b runs in the operating system 23b (refer to FIG. 1).

Figure 4:
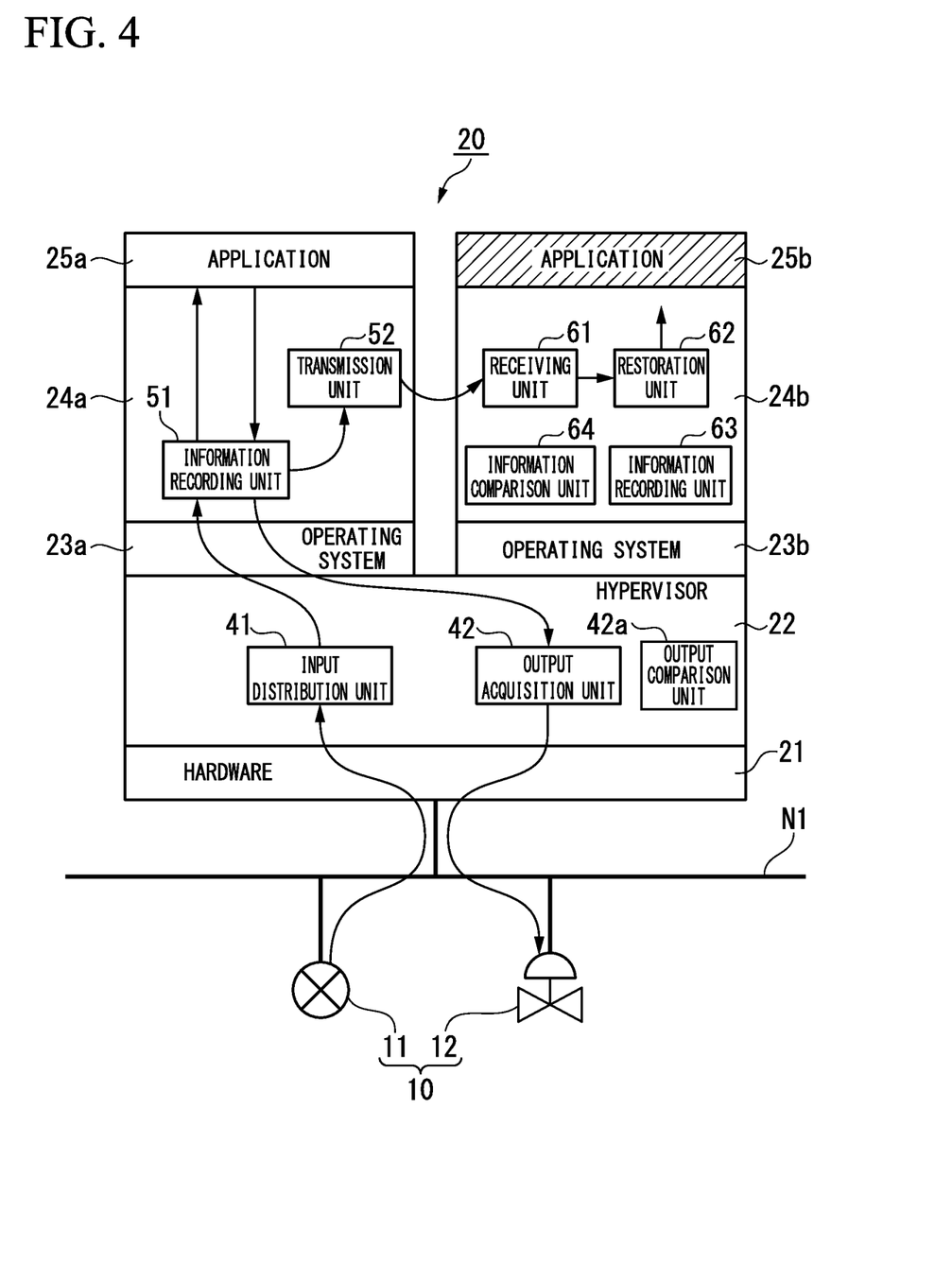
FIG. 4 is a drawing for describing the restoration of an application in the first embodiment of the present invention.

Next, processing to transfer information that was recorded in the information recording unit 51 of the application manager 24a (step S12) and processing to restore the application 25a into the new operating system 23b as the application 25b (step S13, namely "second step") are performed in sequence by the controller 20. FIG. 4 is a drawing for describing the application restoration processing in the first embodiment of the present invention.

As shown in FIG. 4, the process control, the transfer of information and restoration of the application are done by the controller 20 inputting measurement data from the sensor device 11 and outputting control data to the valve device 12 in the same manner as the above-described pre-switching operation. That is, transfer of information and restoration of the application are performed at the controller 20 so as hinder neither the input of measurement data nor the output of control data.

Specifically, at step S12, in the application manager 24a processing is done that reads out the information that was stored in the information recording unit 51 and transmits the information to the application manager 24b by the transmission unit 52. In response, the application manager 24b does processing to receive the information transmitted from the transmission unit 52 of the application manager 24a and to output the received information to the restoration unit 62.

At step S13 (second step), the restoration unit 62 of the application manager 24b uses the history of the second information included in the transferred and received information to perform processing to make the state of the new operating system 23b the same as the internal state of the operating system 23a. The restoration unit 62 also uses the first information included in the transferred and received information to perform processing to restore the application 25a into the operating system 23b.

In this case, the internal state of the operating system 23b that, using the second information history, becomes the same as in the operating system 23a is specifically the following states.

(a) A state of each process making up the application 25a, which includes management information of each process and information of the parent-child relationship thereof.

(b) A state of IPC (inter process communication) between the processes making up the application 25a, which includes message communications between the processes and information of synchronization control, exclusion control, and so on.

(c) A state of the application 25a communicating with outside, which includes a state of the network connection used by the application 25a.

If a part of these statuses can be directly acquired and directly reflected by the functions of the operating system 23a without using the history information, means the same as that which restores the application using the first information may be used. Specifically, an internal state same as that of the operating system 23a may be restored by restoring the state acquired from the operating system 23a in the operating system 23b.

The above-noted processing restores the application 25a in the operating system 23a into the operating system 23b as the application 25b, as shown in FIG. 4. Doing this, in the controller 20, the original operating system 23a and application 25a and the new operating system 23b and application 25b (application equivalent to the application 25a) run in parallel.

When the restoration of the application 25b is completed, the operation of the new operating system 23b and application 25b is verified. Specifically, the operation when data is input (step S14) and the operation when data is output (step S15) are verified. In this case, verification of the operation when data is input is verification of the operation in the case in which, for example, measurement data from the sensor device 11 is input to the controller 20, and verification of the operation when data is output is verification of the operation in the case in which, for example, control data is output to the valve device 12.

Figure 5:
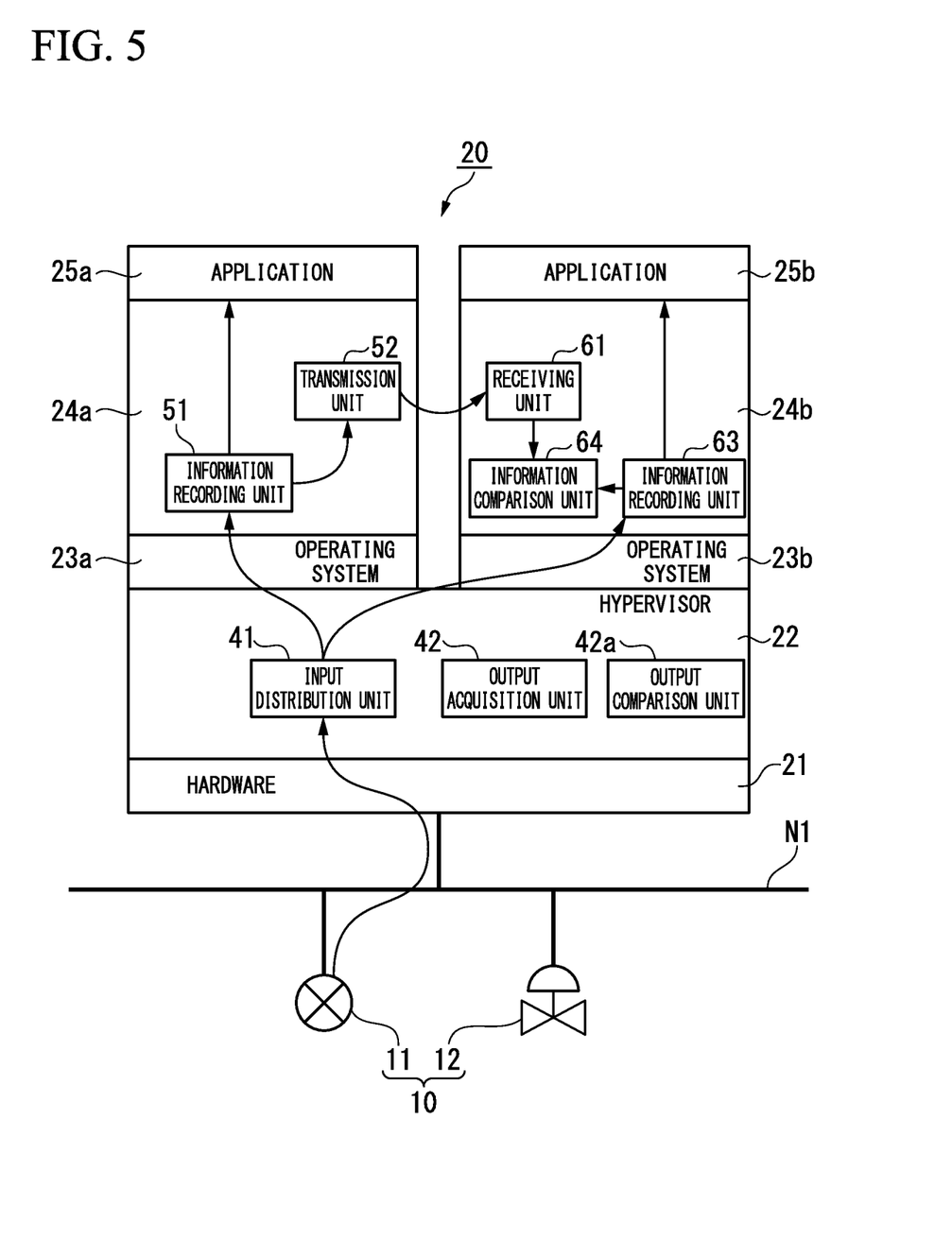
FIG. 5 is a drawing for describing the verification of operation when data is input in the first embodiment of the present invention.

FIG. 5 is a drawing for describing the verification of operation when data is input in the first embodiment of the present invention. As shown in FIG. 5, when measurement data from the sensor device 11 is input to the controller 20, the input distribution unit 41 provided in the hypervisor 22 performs processing to append a timestamp (time t1) to the measurement data and to distribute it to the operating system 23a and the operating system 23b. By distributing the measurement data, the measurement data is input to the operating system 23a the operating system 23b with the same timing.

The measurement data distributed to the operating system 23a is input to the application 25a, via the operating system 23a and the application manager 24a, in that sequence. When this occurs, processing is done to record in the information recording unit 51 information passed between the operating system 23a and the application 25a and, after appending a timestamp (time t11) thereto, output the information to the transmission unit 52. The information that was output to the transmission unit 52 is output to the information comparison unit 64, via the receiving unit 61 of the application manager 24b.

Along with the above, the measurement data that was distributed to the operating system 23b is input to the application 25b, via the operating system 23b and the application manager 24b, in that sequence. When this occurs, processing is performed to record in the information recording unit 63 the information passed between the operating system 23b and the application 25b and also to append a timestamp (time t12) thereto and output the information to the information comparison unit 64.

When information from the receiving unit 61 and information from the information recording unit 63 are input, the information comparison unit 64 compares the information and verifies whether or not the compared information are the same and verifies whether or not the timing gap between the compared information is within a pre-established allowable range. Specifically, in the former verification, for example, a verification is made as to whether or not contents (arguments and returned values) of the system call requested to the operating systems 23a and 23b when measurement data is passed from the operating systems 23a and 23b to the application 25a and 25b are the same between the operating systems 23a and 23b. Also, for example, the verification is made as to whether or not information of signals sent from the operating systems 23a and 23b are the same between the operating systems 23a and 23b.

In the latter verification, using the timestamps that were appended to the information being compared, a verification is done as to whether or not difference in the times required for the processing of the operating systems 23a and 23b to pass the measurement data to the applications 25a and 25b is within a pre-established allowable range. Specifically, a verification is made as to whether or not the difference between the processing time in the operating system 23a (t11−t1) and the processing time in the operating system 23b (t12−t1) is within a pre-established allowable range (for example, 1% of the control time period). The information comparison unit 64, depending upon the results of the above-noted verification, notifies the monitoring apparatus 30 that an abnormality has occurred.

Figure 6:
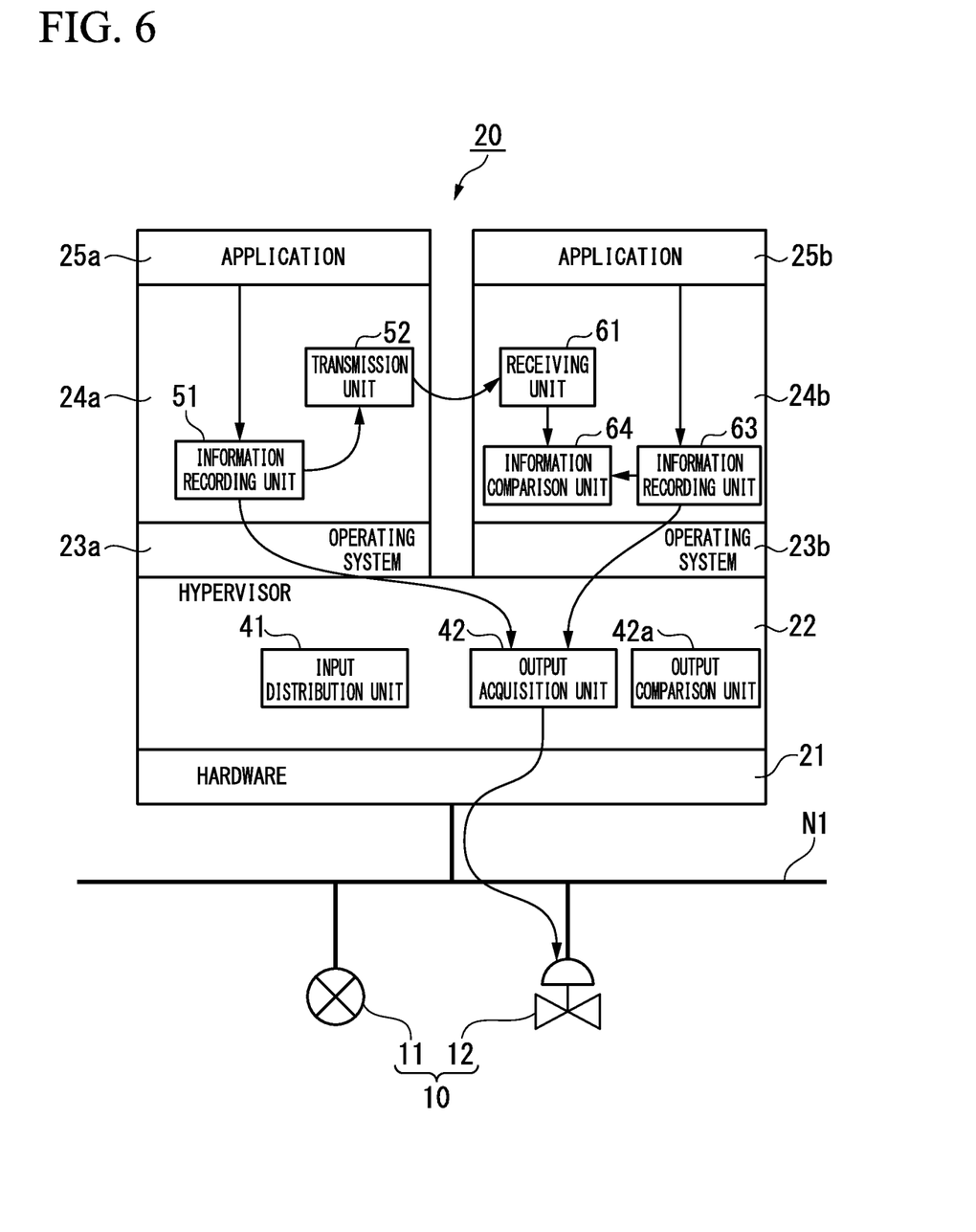
FIG. 6 is a drawing for describing the verification of operation when data is output in the first embodiment of the present invention.

FIG. 6 is a drawing for describing the verification of operation when data is output in the first embodiment of the present invention. When control data is output from the application 25a, the output control data is input to the application manager 24a and, at the information recording unit 51, has a timestamp (time t21) appended thereto, and is output to the output acquisition unit 42 of the hypervisor 22, via the operating system 23a. When this occurs, processing is performed to record in the information recording unit 51 the information passed between the operating system 23a and the application 25a into, and also to append the above-noted time stamp (time t21) thereto and output the information to the information comparison unit 64. The information that was output to the transmission unit 52 is output to the information comparison unit 64 via the receiving unit 61 of the application manager 24b.

Along with the above, when the control data is output from the application 25b, the output control data is input to the application manager 24b, has a timestamp (time t22) appended thereto at the information recording unit 63, and is output to the output acquisition unit 42 of the hypervisor 22, via the operating system 23b. When this occurs, processing is performed that records in the information recording unit 63 the information passed between the operating system 23b and the application 25b, and also that appends the above-noted timestamp (time t22) to the information, and outputs the information to the information comparison unit 64.

When the information from the receiving unit 61 and information from the information recording unit 63 are input, the information comparison unit 64 compares these information and verifies whether or not the compared information is the same and also verifies whether or not the timing gap between the compared information is within a pre-established allowable range. Specifically, in the former verification, the verification performed is the same as described for the case of "verification of operation when data is input," using FIG. 5. In the latter verification, using the timestamp (time t21) that was appended to the information from the receiving unit 61 as a reference, the verification is performed as to whether or not the timestamp (time t22) that was appended to the information from the information recording unit 63 is within a pre-established allowable range. The information comparison unit 64, depending upon the results of the above-noted verification, notifies the monitoring apparatus 30 that an abnormality has occurred.

When control data from the operating systems 23a and 23b is input to the output acquisition unit 42, the output acquisition unit 42 outputs the control data output from the operating system 23a to the valve device 12. The output acquisition unit 42 appends a timestamp (time t31) to the control data from the operating system 23a and also appends a timestamp (time t32) to the control data from the operating system 23b and passes these to the output comparison unit 42a. The output comparison unit 42a compares the control data passed to it from the output acquisition unit 42 and, in the same manner as the information comparison unit 64, verifies whether or not the contents of the compared control data are the same and also verifies whether or not the timing gap between the compared control data is within a pre-established allowable range.

In this case, in the former verification, for example, the verification is performed as to whether or not the control data from the operating systems 23a and 23b are the same value. In the latter verification, the timestamps that had been appended to the control data are used to verify whether the difference in the time required for processing the control data by operating systems 23a and 23b is within a pre-established allowable range.

Specifically, verification is done as to whether or not the difference between the processing time in the operating system 23a (t31−t21) and the processing time in the operating system 23b (t32−t22) is within a pre-established allowable range. Alternatively, verification is done as to whether or not the difference between the timestamps appended to the control data when input is made to the output acquisition unit 42 (t31 and t32) is within a pre-established allowable range. The output comparison unit 42a, depending upon the result of the above-noted verification, notifies the monitoring apparatus 30 that an abnormality has occurred. In this manner, the verification of operation when data is output makes a comparison by the information comparison unit 64 of the application manager 24b and makes a comparison by the output comparison unit 42a of the hypervisor 22.

In the above-described operational verifications (verification of operation when data is input and verification of operation when data is output), depending upon the result of the verifications, notification is made to the monitoring apparatus 30 that an abnormality has occurred. When this occurs, in addition to the notification made to the monitoring apparatus 30, the information comparison unit 64 and output comparison unit 42a and the like may stop the operating system 23b and the application 25b as abnormal operation has occurred.

Next, the monitoring apparatus 30 judges whether or not the operational verification has terminated (step S16). If the judgment is that the operational verification has not yet terminated (NO judgment result at step S16), the operational verification is continued (steps S14 and S15). If, however, the judgment is that the operational verification has terminated (YES judgment result at step S16), the monitoring apparatus 30 judges whether or not the operational verification has terminated normally (step S17).

If the judgment is that the operational verification has terminated normally (YES judgment result at step S17), the monitoring apparatus 30 transmits an operational verification normal termination instruction to the controller 20. When the operational verification normal termination instruction is sent, the output comparison unit 42a of the controller 20 outputs to the valve device 12 control data from the operating system 23b in place of the control data from the operating system 23a. The controller 20 performs processing to stop the original operating system 23a, application manager 24a, and application 25a, thereby switching the operating systems (step S18).

In contrast to the above, if the judgment is that the operational verification terminated abnormally (NO judgment result at step S17), the monitoring apparatus 30 transmits an operational verification abnormal termination instruction to the controller 20. When the operational verification abnormal termination instruction is sent, if the new operating system 23b, application manager 24b, and application 25b were not stopped at the controller 20, it performs processing to stop them (step S19). This results in the state enabling a retry of the operating system updating.

As described above, in the present embodiment, the hypervisor 22 is run in the hardware 21, in place of hardware, thereby enabling parallel operation of the original operating system 23a and the new operating system 23b. The information required for restoring the application 25a and information passed between the operating system 23a and the application 25a are then recorded in the information recording unit 51 and, using the information recorded in the information recording unit 51, the application 25a running in the operating system 23a is restored into the operating system 23b.

This enables updating of the operating system 23a to the operating system 23b without stopping the process control system 1. Also, because the application 25a in the operating system 23a and the application 25b in the operating system 23b run in parallel and the operating systems are switched after verifying the operation of the application 25b, the continued operation of the application 25b in the newer operating system 23b of which version upgraded can be assured.

In addition, because parallel operation means that at least one of the applications 25a and 25b will run continuously, it is guaranteed that control of the field devices 10 performed by the application will not stop, including during the time of updating the operating system. Additionally, during the time of updating the operating system, because restoration is made to the configuration before updating by just stopping the operating system 23b and the application 25b, even if the operational verification judges that there is an abnormality, it is possible to re-try the updating of the operating system any number of times.

The above-described embodiment records the information passed between the operating system 23a and the application 25a, that is, the second information, into the information recording unit 51 and records the information passed between the operating system 23b and the application 25b into the information recording unit 63 and ultimately compares, with the information comparison unit 64, information that is the combination of the second information and a timestamp appended by a series of processing and information that is the combination of the information passed between the operating system 23b and the application 25b and a timestamp appended by a series of processing.

However, because not only the second information, but also the first information required for restoration of the application changes because of data input and data output, even if the first information is used in place of the second information, it is possible to perform an operational verification in the same manner as in the case of using the second information.

In this case, the first information, rather than the second information, is recorded into the information recording unit 51, and the information recording unit 63, instead of the information passed between the operating system 23b and the application 25b, records information of the application 25b corresponding to the first information of the application 25a restored into the operating system 23b.

In this case, the information corresponding to the first information is information similar to the information required for restoration of the application, this referring to, for example, downloaded programs and data resident in a memory space.

Additionally, the information comparison unit 64 may compare not only one of the first information and the second information, but rather compare both the first information and the second information.

Because the first information represents the internal state of the application, comparing both the first information and the second information achieves the effect of enabling a detailed verification of abnormalities. For example, when a comparison of the second information reveals an abnormality, referring also to the results of comparing the first information (location and details of the differences resulting from the comparison) enables verification of whether or not the abnormality is within the scope of anticipated operation of the application in the updated operating system.

The first information and the second information might be stored at a time of inputting and outputting data. Not only that, the first information and the second information might be compared, for the case of the first information, by storing internal states after important process of the application, for the case of the second information, by storing execution contents of system calls without data input and output.

As an aid to understanding the above-described embodiment, the description has been for the example of the original operating system 23a being updated to the new operating system 23b. For this reason, the application manager 24a running in the original operating system 23a has the information recording unit 51, and the transmitting unit 52, and the application manager 24b running in the new operating system 23b has the elements ranging from the receiving unit 61 to the information comparison unit 64.

It can also be envisioned that the new operating system 23b is updated to an even newer operating system because of reasons of detecting newer vulnerability, and so on. For this reason, the configuration of the application manager running in the operating system may have both the application managers 24a and 24b shown in FIG. 1, and may be made switchable by setting the operating mode so as to cause either application managers 24a and 24b to run.

The above-described embodiment has been described for the case in which the monitoring apparatus 30 monitors the controller 20 and instructs the controller 20 to update the operating system 23a. However, the monitoring apparatus 30 can be envisioned as being configured to be separated into functions that perform the instructions and monitoring occurring in flow of the above-noted embodiment (updating monitoring functions) and functions that perform other instructions and monitoring (control monitoring functions and the like). In such a configuration, the updating and monitoring functions may be incorporated into a computer performing control system settings, such as an engineering workstation, or a computer or the like in which a system updating program is stored or which runs a server that manages states of applications (an implementation example being Windows (registered trademark) Server Update Services).

In addition to the above, when making a normal termination to the operational verification, if it is not necessary to monitor the judgment regarding the switching of the operating systems by the monitoring apparatus 30, for example, if absolutely no abnormality is detected by the information comparison unit 64 for a certain period of time, the information comparison unit 64 or output comparison unit 42a may, in place of the monitoring apparatus 30, give an operational verification termination instruction so that the operating system switching is done automatically. In this case, the condition for switches the operating systems is input beforehand to the information comparison unit 64 or output comparison unit 42a, via the monitoring apparatus 30 or the like.

Also, if the switching of the operating systems 23a and 23b can be determined in accordance with whether an abnormality is detected or not, the information recording unit 51 and the information recording unit 63 may reducing the amount of the first information and the second information by compressing so as to reduce the comparing process of the information comparison unit 64 and the output comparison unit 42a. Specifically, processing to convert a part of the information to hash values using a one-way hash function such as MD5, calculating differences between previous information and current information so that positions of the differences and contents of the differences are output, or the like, may be done.

Also, after the operational verification of the operating system 23b ends in a normal way, there may be a case where the controller 20 permanently operates the set of the operating system 23b, the application manager 24b, and the application 25b instead of the set of the operating system 23a, the application manager 24a, and the application 25a. In the case, it is necessary that a program implementing the application 25b is installed on the operating system 23b so that the application 25b can be operated after rebooting the controller 20. The reason is that the application 25b restored by the restoration unit 62 is deleted because the application 25b is stored in a volatile memory.

Second Embodiment

Figure 7:
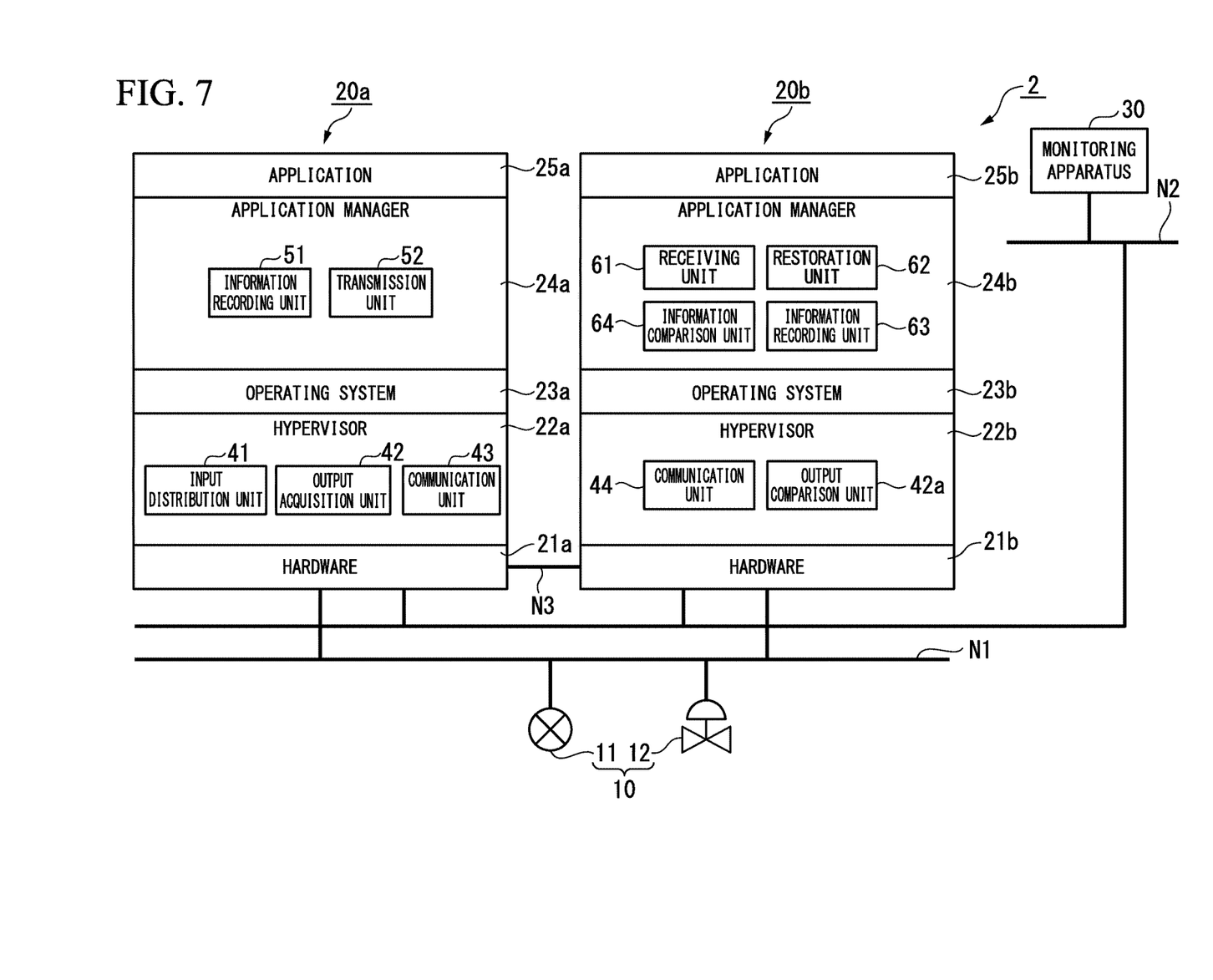
FIG. 7 is a block diagram showing the main parts of the configuration of a process control system according to a second embodiment of the present invention.

FIG. 7 is a block diagram showing the main part of the configuration of a process control system according to the second embodiment of the present invention. In FIG. 7, constituent elements that are the same as in FIG. 1 are assigned the same reference numeral. As shown in FIG. 7, a process control system 2 of the present embodiment has two controllers 20a and 20b (first and second process control apparatuses) in place of the controller 20, these controllers 20a and 20b being connected to the control network N2, with an inter-hypervisor network N3 connecting therebetween.

The controller 20a has a hypervisor 22a implemented in hardware 21a, with the operating system 23a, the application manager 24a, and the application 25a implemented in the hypervisor 22a. The hypervisor 22a, in addition to having the input distribution unit 41 and the output acquisition 42 of the hypervisor 22 of FIG. 1, has a communication unit 43. The communication unit 43, for example, communicates with the hypervisor 22b implemented in the controller 20b, via the inter-hypervisor network N3.

The controller 20b has a hypervisor 22b implemented in hardware 21b, with the operating system 23b, the application manager 24b, and the application 25b implemented in the hypervisor 22b. The hypervisor 22b, in addition to having the output comparison unit 42a of the hypervisor 22 of FIG. 1, has a communication unit 44. The communication unit 44, for example, communicates with the hypervisor 22a implemented in the controller 20a, via the inter-hypervisor network N3. The provision of the output comparison unit 42a in the hypervisor 22b of the controller 20b is so that the operation of the controller 20a in which the original operating system 23a runs is not affected.

In this case, mutual communication between the communication unit 43 provided in the hypervisor 22a of the controller 20a and the communication unit 44 provided in the hypervisor 22b of the controller 20b logically integrates and runs the hypervisors 22a and 22b. Similar to the case of the first embodiment, this enables distribution to the operating systems 23a and 23b of measurement data input to the input distribution unit 41, and enables acquisition by the output acquisition unit 42 of control data output from the operating system 23a and output thereof to the output comparison unit 42a.

Control data output from the operating system 23b is directly output to the output comparison unit 42a. Similar to the first embodiment, control data acquired from the operating system 23b is not output to the valve device 12 and is only compared by the output comparison unit 42a. For this reason, in the second embodiment, it is sufficient to directly output to the output comparison unit 42a existing on the same controller 20b.

The inter-hypervisor network N3, provided separately from the field network N1 and the control network N2, is used for communication between the communication unit 43 provided in the hypervisor 22a of the controller 20a and the communication unit 44 provided in the hypervisor 22b of the controller 20b. The inter-hypervisor network N3 is provided to prevent communication between the communication units 43 and 44 from having an adverse effect, for example, reduction of the communication speed of the field network N1 and the control network N2. For this reason, as long as an adverse effect such as reduction of the communication speed of the field network N1 and the control network N2 does not occur, the inter-hypervisor network N3 may be omitted.

Although the input distribution unit 41 and the output acquisition unit 42 are provided in the hypervisor 22a in the example shown in FIG. 7, the input distribution unit 41 and the output acquisition unit 42 may be provided in the hypervisor 22b. However, if the controller 20a is, for example, the controller that controls the actual process and the controller 20b is the new controller to be used, if it is desired to achieve stable operation by the previous operating track record, it is desirable that the input distribution unit 41 and the output acquisition unit 42 be provided in the hypervisor 22a.

When the process control system 2 having the above-noted configuration updates the controller 20a, processing basically the same as that shown in the flowchart of FIG. 3 is performed. That is, first, in the controller 20a information required for the restoration of the above-described application 25a and information passed between the operating system 23a and the application 25a are recorded in the information recording unit 51 (first step). Next, using this information, the application 25a is restored into the controller 20b as the application 25b (step S13, namely "second step"). After that, in the controller 20b, verification of the operation when data is input (step S14) and verification of the operation when data is output (step S15) are performed.

As noted above, in this embodiment as well, similar to the first embodiment, information required for the restoration of the application 25a and information passed between the operating system 23a and the application 25a are recorded in the information recording unit 51. Then, using the information that was recorded in the information recording unit 51, the application 25a to be run in the operating system 23a is restored into the operating system 23b.

Doing the above enables the updating of the operating system 23a to the operating system 23b without stopping the process control system 2. Also, because the application 25a in the operating system 23a and the application 25b in the operating system 23b run in parallel, the continued operation of the application 25b running in the newer operating system 23b of which version upgraded can be assured.

In addition, because parallel operation means that at least one of the applications 25a and 25b will run continuously, it can be assured that control of the field devices 10 by the application will not stop, including during the time of updating of the operating system. Additionally, during the operating system updating, because restoration is made to the configuration before updating by just stopping the operating system 23b and the application 25b, even if the operational verification judges that there is an abnormality, it is possible to re-try the updating of the operating system any number of times.

In order to switch the output of control data to the valve device 12 to the output from the new controller 20b and then stop of the original controller 20a (i.e., perform controller replacement), it is necessary for the new controller 20b to have functionality that is an alternative to the input distribution unit 41 and the output acquisition unit 42 of the original controller 20a.

For this reason, the configuration of the virtualization unit operating in the hardware is made to have the configurations of both the virtualization units 22a and 22b in FIG. 7, enabling switching of either virtualization unit 22a or virtualization unit 22b to run, by setting the operating mode. At the step in FIG. 3 of switching the operating system in the second embodiment (step S18), the configuration of the virtualization unit of the new controller 20b is switched to that of the virtualization unit 22a, and control data output from the operating system 23b is passed to the output acquisition unit of the new controller 20b. When switching is done, the input of control data to the operating system 23b is made from the input distribution unit of the new controller 20b. Doing the above eliminates the need for exchange with the original controller 20a from the new controller 20b that has been switched to and enables the stopping of the original controller 20a.

In the second embodiment, the information comparison unit 64 and the output comparison unit 42a are caused to operate in the controller 20b in which the new operating system 23b runs. For this reason, it is possible to verify the updating of the operating system and to verify the operation after updating, without influencing the operation of the application 25a and operating system 23a that are running in the controller 20a.

In the first and second embodiment described above, because the information comparison unit 64 and the output comparison unit 42a perform comparisons, the operation can be verified, focusing on the hypervisor, the operating system, and the application, and on the series of operations of the operating system and the hypervisor. This enables more certain knowledge of a location of a problem in operation. This also facilitates the judgment of the location of an operational problem, because this reduces the amount of information needed to be verified, compared to the case in which each operating step is tracked by debugging and the like, focusing on the operating system or the application operation.

Although a process control apparatus, a process control system, and an updating method therefor according to embodiments of the present invention have been described above, the present invention is not restricted to the above-described embodiments, and can be freely modified within the scope thereof. For example, although the foregoing descriptions of the embodiments have been examples in which a virtual environment that can run a plurality of operating systems or applications is implemented in the controller 20, 20a, and 20b with the hypervisors 22, 22a, and 22b, the means for implementing such a virtual environment is not restricted to being the hypervisor 22. For example, the above-noted virtual environment may be implemented with hardware.

Also, although the above descriptions of the embodiments took the example of field devices 10 capable of digital communication via the field network N1, field devices that perform input and output of analog signals may be used. When such field devices are used, an I/O node that converts signals (analog signals) input and output by the field devices and signals (digital signals) communicated via the field network N1 can be connected to the field network N1, and the I/O node can be connected to the field devices by an analog transmission path (for example, a transmission path used for transmission of 4 to 20 mA signals).

Although the first and second embodiments were described for data input and data output with respect to the field devices 10 and the monitoring apparatus 30 passing through field network N1 and control network N2, it can be envisioned that, for example, the hardware 21, 21a, and 22b themselves input and output data, such as a hardware fixed-period timer interrupt. In this case, input and output of data are not made with respect to the field devices 10 and the monitoring apparatus 30, but are rather processed internally in the hardware 21, 21a, and 21b.

The term "configured" is used to describe a component, unit or part of a device includes hardware and/or software that is constructed and/or programmed to carry out the desired function.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A process control apparatus that controls an industrial process implemented in a plant, the process control apparatus comprising one or more processors configured to execute:
   a virtualization unit configured to operate in hardware;
   first and second operating systems configured to run in the virtualization unit;
   an application configured to run in the first operating system, and configured to control the industrial process by communicating with field devices performing at least one of measurement and actuation required for control of the industrial process;
   a recording unit configured to record a first information required for restoration of the application and a second information passed between the first operating system and the application; and
   a restoration unit configured to use a history of the second information recorded in the recording unit to set the second operating system to be the same in internal state as the first operating system, and configured to use the first information to restore the application running in the first operating system into running in the second operating system which has been set to be the same in the internal state as the first operating system, wherein the second operating system is different in version from the first operating system,
   wherein the same internal state includes:
   a) a state of each process making up the application, including management information of each process and information of a parent-child relationship thereof;
   b) a state of inter process communication between processes making up the application, including message communications between the processes; and
   c) a state of the application communicating outside, including a state of a network connection used by the application.

2. The process control apparatus according to claim 1, further comprising a comparison unit configured to perform at least one of an operation of comparing the first information with information corresponding to the first information of the application restored in the second operating system and an operation of comparing the second information with information that is passed between the second operating system and the application restored in the second operating system.

3. The process control apparatus according to claim 2, wherein the comparison unit performs a verification of whether or not the contents of the compared information are the same and a verification of whether or not the timing gap of the compared information is within a pre-established allowable range.

4. The process control apparatus according to claim 2, wherein the recording unit is provided within a first middleware installed between the first operating system and the application, and the restoring unit and the comparison unit are provided within a second middleware installed between the second operating system and the application restored in the second operating system.

5. The process control apparatus according to claim 1, further comprising:
   a distribution unit configured to be provided in the virtualization unit to distribute information from the field devices to the first and second operating systems; and
   an acquisition unit configured to be provided in the virtualization unit to acquire outputs of the first and second operating systems and output one thereof to the field devices.

6. The process control apparatus according to claim 5, further comprising an output comparison unit configured to compare the outputs of the first and second operating systems acquired by the acquisition unit.

7. The process control apparatus according to claim 6, wherein the output comparison unit performs a verification of whether or not the content of the compared outputs of the first and second operating systems are the same and a verification of whether or not the timing gap of the compared outputs of the first and second operating systems is within a pre-established allowable range.

8. The process control apparatus according to claim 1, wherein the hardware is configured to be connected to the field devices via a first network.

9. The process control apparatus according to claim 8, wherein the hardware is configured to be connected to a monitoring apparatus via a second network, the monitoring apparatus monitoring the first and second operating systems and the application.

10. A process control system that controls an industrial process implemented in a plant, the process control system comprising:
    a first process control apparatus that has one or more processors configured to execute:
    a first virtualization unit configured to run in first hardware;
    a first operating system configured to run in the first virtualization unit;
    an application configured to run in the first operating system, and configured to control the industrial process by communicating with field devices performing at least one of measurement and actuation required for control of the industrial process; and a recording unit configured to record a first information required for restoration of the application and a second information passed between the first operating system and the application; and a second process control apparatus that has one or more processors configured to execute:

a second virtualization unit configured to run in second hardware and logically integrated with the first virtualization unit;

a second operating system configured to run in the second virtualization unit; and a restoration unit configured to use a history of the second information recorded in the recording unit to set the second operating system to be the same in internal state as the first operating system, and configured to use the first information to restore the application running in the first operating system into running in the second operating system which has been set to be the same in the internal state as the first operating system wherein the second operating system is different in version from the first operating system, wherein the same internal state includes:

a) a state of each process making up the application, including management information of each process and information of a parent-child relationship thereof;

b) a state of inter process communication between processes making up the application, including message communications between the processes; and c) a state of the application communicating outside, including a state of a network connection used by the application.

11. The process control system according to claim 10, further comprising a comparison unit configured to perform at least one of an operation of comparing the first information with information corresponding to the first information of the application restored in the second operating system and an operation of comparing the second information with information that is passed between the second operating system and the application restored in the second operating system.

12. The process control system according to claim 11, wherein the comparison unit performs a verification of whether or not the contents of the compared information are the same and a verification of whether or not the timing gap of the compared information is within a pre-established allowable range.

13. The process control system according to claim 11, wherein the recording unit is provided within a first middleware installed between the first operating system and the application, and the restoring unit and the comparison unit are provided within a second middleware installed between the second operating system and the application restored in the second operating system.

14. The process control system according to claim 10, further comprising:

a distribution unit configured to distribute information from the field devices to the first and second operating systems; and an acquisition unit configured to be provided in the first virtualization unit to acquire outputs of the first and second operating systems and output one thereof to the field devices.

15. The process control system according to claim 14, further comprising an output comparison unit configured to compare the outputs of the first and second operating systems acquired by the acquisition unit.

16. The process control system according to claim 15, wherein the output comparison unit performs a verification of whether or not the content of the compared outputs of the first and second operating systems are the same and a verification of whether or not the timing gap of the compared outputs of the first and second operating systems is within a pre-established allowable range.

17. The process control system according to claim 10, wherein the first hardware is configured to be connected to the field devices via a first network, and the second hardware is configured to be connected to the field devices via the first network.

18. The process control system according to claim 17, wherein the first hardware is configured to be connected to a monitoring apparatus via a second network, and the second hardware is configured to be connected to the monitoring apparatus via the second network, the monitoring apparatus monitoring the first and second operating systems and the application.

19. An updating method for a process control apparatus that controls an industrial process implemented in a plant, the method comprising:

a first step of recording a first information required for restoration of an application and a second information passed between a first operating system that runs in a virtualization unit running in hardware to cause the application to run and the application; and a second step of using a history of the second information recorded by the first step to set a second operating system that runs in the virtualization unit to be the same in internal state as the first operating system, and using the first information to restore the application that runs in the first operating system into running in the second operating system which has been set to be the same in internal state as the first operating system, wherein the second operating system is different in version from the first operating system, wherein the same internal state includes:

a) a state of each process making up the application, including management information of each process and information of a parent-child relationship thereof;

b) a state of inter process communication between processes making up the application, including message communications between the processes; and c) a state of the application communicating outside, including a state of a network connection used by the application.

20. An updating method for a process control system having first and second process control apparatuses that control an industrial process implemented in a plant, the method comprising:

a first step of recording a first information required for restoration of an application running in the first process control apparatus and a second information passed between a first operating system that runs the application and the application; and a second step of using a history of the second information recorded by the first step to set a second operating system running in the second process control apparatus to be the same in internal state as the first operating system running in the first process control apparatus and using the first information to restore the application running in the first operating system into running in the second operating system which has been set to be the same in the internal state as the first operating system, wherein the second operating system is different in version from the first operating system, wherein the same internal state includes:
a) a state of each process making up the application, including management information of each process and information of a parent-child relationship thereof;
b) a state of inter process communication between processes making up the application, including message communications between the processes; and
c) a state of the application communicating outside, including a state of a network connection used by the application.

* * * * *